United States Patent
Oohira (10) Patent No.: US 8,446,557 B2
(45) Date of Patent: May 21, 2013

(54) LIQUID CRYSTAL DISPLAY DEVICE

(75) Inventor: Eiji Oohira, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 248 days.

(21) Appl. No.: 13/053,315

(22) Filed: Mar. 22, 2011

(65) Prior Publication Data

US 2011/0242448 A1   Oct. 6, 2011

(30) Foreign Application Priority Data

Mar. 30, 2010   (JP) .................................. 2010-078924

(51) Int. Cl.
*G02F 1/1345* (2006.01)

(52) U.S. Cl.
USPC .......................................... 349/150; 349/149

(58) Field of Classification Search
USPC ........................................................ 349/150
See application file for complete search history.

(56) References Cited

U.S. PATENT DOCUMENTS

| | | | |
|---|---|---|---|
| 6,358,065 B1 * | 3/2002 | Terao et al. ...................... 439/67 |
| 6,835,961 B2 * | 12/2004 | Fukayama ........................ 257/84 |
| 7,192,176 B2 * | 3/2007 | Lo et al. .......................... 362/612 |
| 7,244,966 B2 * | 7/2007 | Fukayama ........................ 257/98 |
| 7,359,012 B2 * | 4/2008 | Ishiwa et al. ..................... 349/65 |
| 7,414,680 B2 * | 8/2008 | Lee et al. .......................... 349/58 |
| 7,439,553 B2 * | 10/2008 | Fukayama et al. .............. 257/98 |
| 7,463,325 B2 * | 12/2008 | Oohira ........................... 349/149 |
| 7,557,888 B2 * | 7/2009 | Oohira ........................... 349/149 |
| 7,570,312 B2 * | 8/2009 | Kim .................................. 349/56 |
| 2002/0080298 A1 * | 6/2002 | Fukayama ........................ 349/58 |
| 2005/0062902 A1 * | 3/2005 | Fukayama ........................ 349/58 |
| 2007/0268444 A1 * | 11/2007 | Azuma et al. .................. 349/150 |
| 2011/0242448 A1 * | 10/2011 | Oohira ............................ 349/60 |

FOREIGN PATENT DOCUMENTS

JP   2010-276808   12/2010

* cited by examiner

*Primary Examiner* — Rhonda Peace
(74) *Attorney, Agent, or Firm* — Antonelli, Terry, Stout & Kraus, LLP.

(57) ABSTRACT

The liquid crystal display device according to the present invention is a thin liquid crystal display device where it is easy to position the flexible printed circuit on which light emitting diodes are mounted. In the liquid crystal display device having a liquid crystal display panel and a flexible printed circuit (FPC) that is connected to the liquid crystal display panel and supplies power for driving display pixels, light emitting diodes (LED) are mounted on a portion of the flexible printed circuit, a mold frame MFR is provided to contain the light emitting diodes, and through holes (60, 61) for positioning are created in both the flexible printed circuit and the mold frame.

4 Claims, 11 Drawing Sheets

LIQUID CRYSTAL DISPLAY DEVICE

CROSS-REFERENCE TO RELATED APPLICATION

The present application claims priority over Japanese application JP2010-078924 filed on Mar. 30, 2010, the contents of which are hereby incorporated into this application by reference.

BACKGROUND OF THE INVENTION (1) Field of the Invention

The present invention relates to a liquid crystal display device, and in particular to a liquid crystal display device where positioning of a flexible printed circuit connected to the liquid crystal display panel is improved.

(2) Description of the Related Art

Liquid crystal display modules (liquid crystal display devices) are used as the display device of various portable information apparatuses, such as portable phones, portable information terminals (PDA's), digital cameras and multimedia players.

The demand is high for reducing the thickness and narrowing the frame of these liquid crystal display modules, such as portable phones. Therefore, as shown in JP2010-276808A, in the backlight portion for supplying backlight to the liquid crystal display panel in the liquid crystal display module, no space for incorporating light emitting diodes, which are the light source of the backlight, into the backlight portion can be secured, and thus a structure where the light emitting diodes are mounted on the flexible printed circuit, which is externally connected, is adopted.

Figure 1:
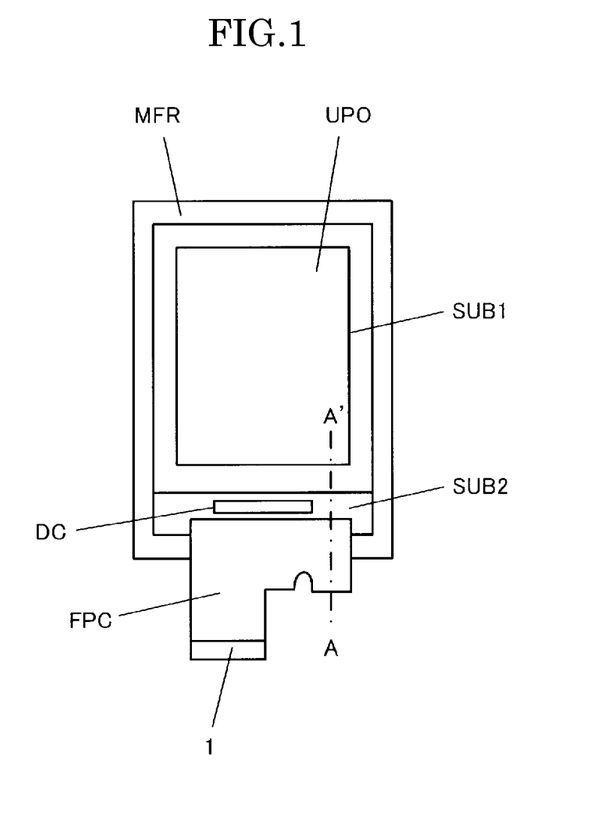
FIG. 1 is a plan diagram showing the front side of a liquid crystal display device.

FIG. 1 shows a liquid crystal display panel that is formed of a liquid crystal layer sealed between two glass substrates (SUB1, SUB2) and provided within a mold frame MFR made of a resin. In addition, a flexible printed circuit (FPC) for a liquid crystal display panel that supplies an electrical signal to the liquid crystal display panel and the semiconductor chip (DC) for driving the display pixels is connected to and provided on the liquid crystal display panel. In the flexible printed circuit, an interface terminal portion 1 is formed for the liquid crystal display panel in such a manner as to extend straight from the liquid crystal display panel, part of the flexible printed circuit is folded to cover the rear surface, and the portion 2 on which light emitting diodes are mounted is secured to a predetermined location within the mold frame MFR.

Figure 3:
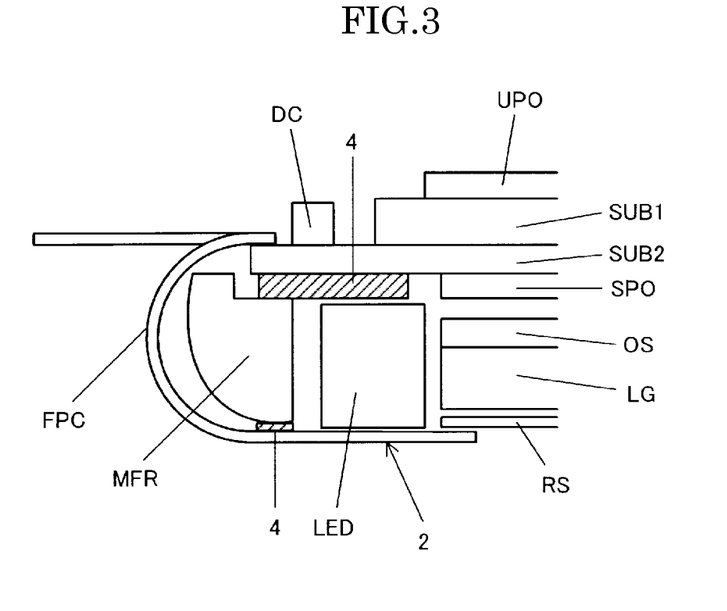
FIG. 3 is a cross sectional diagram along a single-dotted chain line A-A' in FIG. 1.

FIG. 3 is a cross sectional diagram along single-dotted chain line A-A' in FIG. 1. The liquid crystal display panel is secured to the mold frame MFR with a double-sided adhesive tape 4, the light emitting diodes LED are mounted on the flexible printed circuit FPC, and the flexible printed circuit FPC is secured to the mold frame using the double-sided adhesive tape 4. In the liquid crystal display panel, an upper polarizing plate UPO and a lower polarizing plate SPO are pasted to the outside of the glass substrates. In addition, a reflective sheet RS, a light guiding plate LG and an optical sheet OS formed of a prism sheet and a diffusion sheet, which form a backlight, are provided in a predetermined location within the mold frame.

Figure 2:
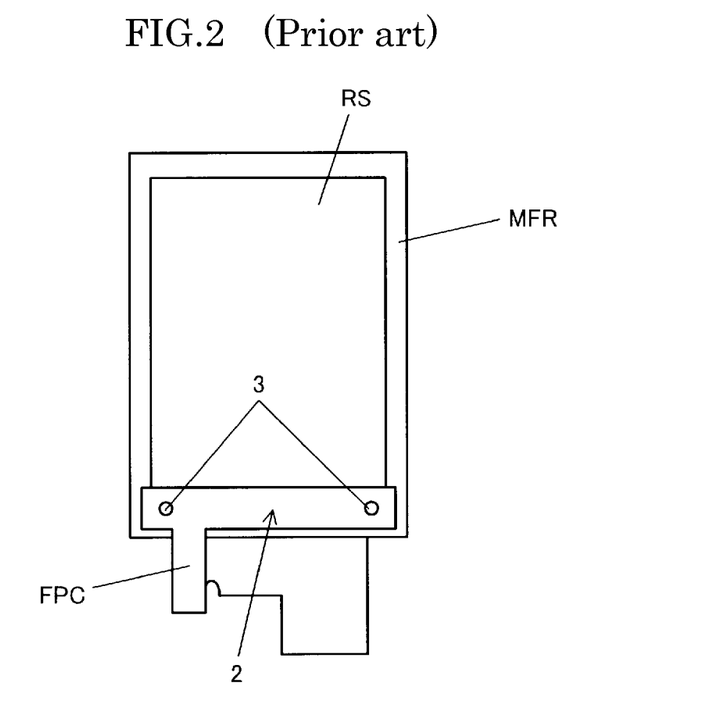
FIG. 2 is a plan diagram showing the rear side of a conventional liquid crystal display device.

As shown in FIG. 2, the part of the flexible printed circuit on which light emitting diodes LED are mounted is positioned by boss pins 3 provided on the mold frame MFR or the light guiding plate LG. Through holes are created in the locations of the flexible printed circuit FPC that correspond to the boss pins 3.

Figure 4:
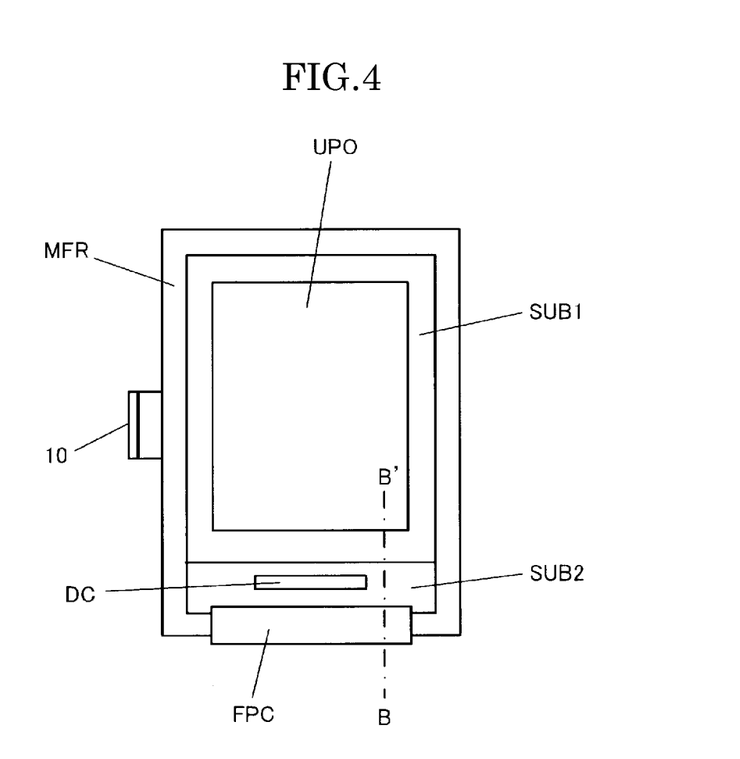
FIG. 4 is a plan diagram showing the front side of another liquid crystal display device.
Figure 5:
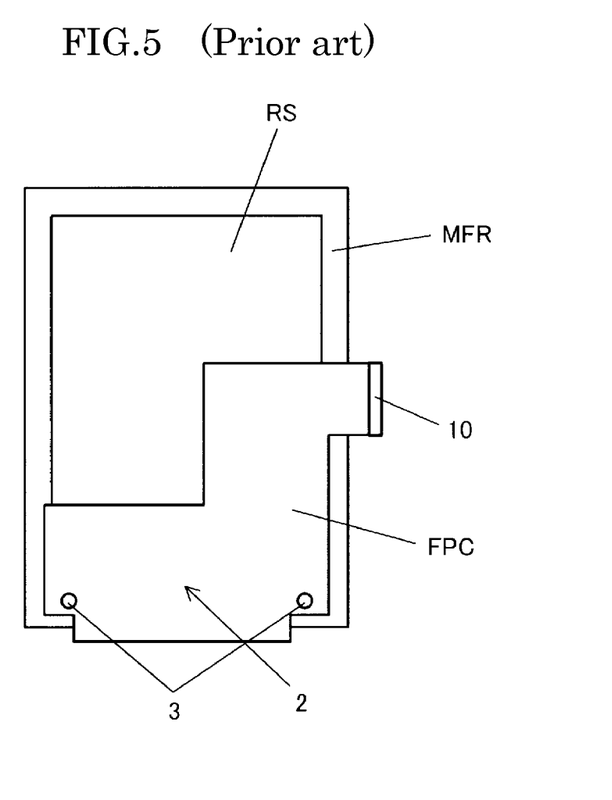
FIG. 5 is a plan diagram showing the rear side of another conventional liquid crystal display device.
Figure 6:
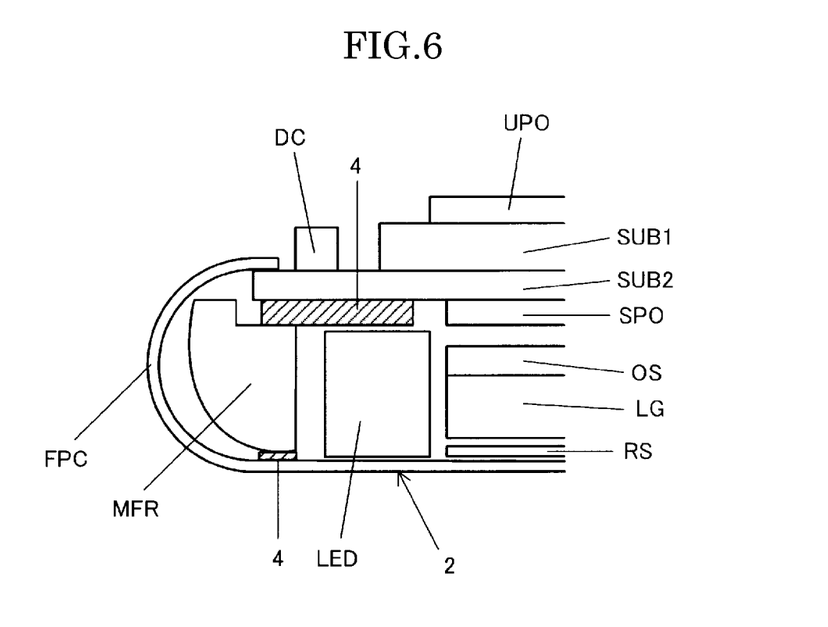
FIG. 6 is a cross sectional diagram along a single-dotted chain line B-B' in FIG. 4.

FIGS. 4 and 6 are diagrams showing other embodiments where light emitting diodes LED are mounted on a flexible printed circuit for a liquid crystal display panel. In FIG. 4, the entirety of the flexible printed circuit is folded towards the backlight (rear side of the mold frame), and an interface terminal portion 10 for a liquid crystal display panel is formed so as to extend from the rear of the mold frame MFR to the side.

FIG. 6 is a cross sectional diagram along single-dotted chain line B-B' in FIG. 4. The portion 2 of the flexible printed circuit FPC on which light emitting diodes LED are mounted is secured to the mold frame MFR in a predetermined location on the rear side. The portion 2 is positioned by boss pins 3 formed on the mold frame MFR or the light guiding plate LG.

Figure 7:
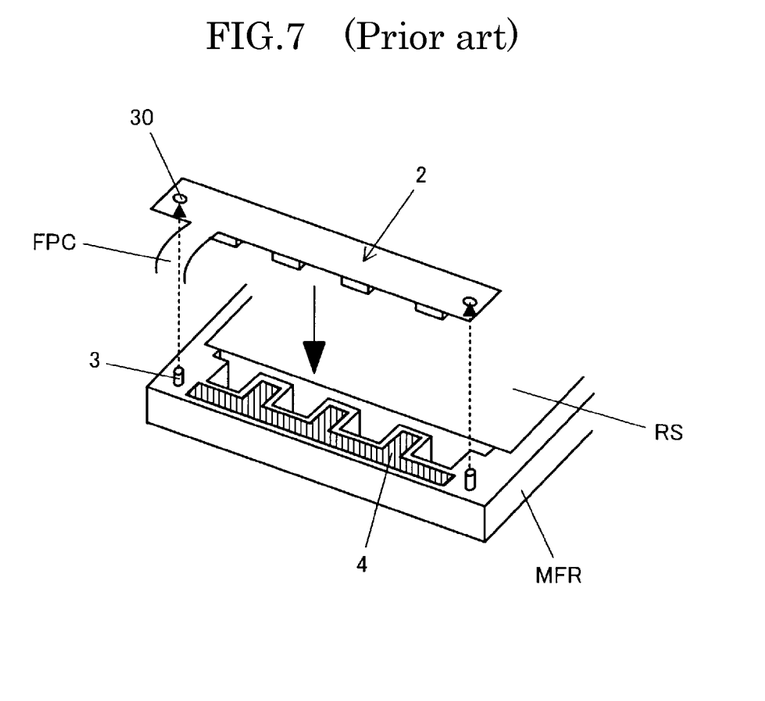
FIG. 7 is a perspective diagram showing how the portion on which light emitting diodes are mounted is attached during the process for assembling a conventional liquid crystal display device.
Figure 8:
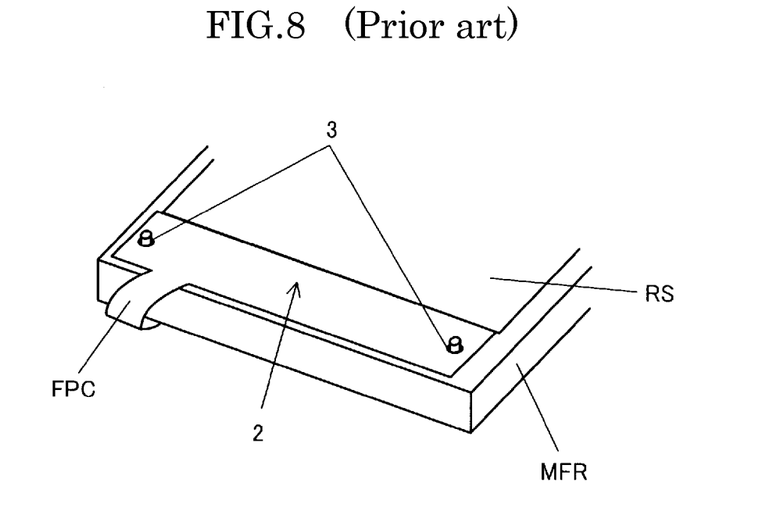
FIG. 8 is a diagram showing the state where the attachment according to FIG. 7 has been completed.

FIGS. 7 and 8 show how the portion of a conventional liquid crystal display module on which light emitting diodes are mounted is assembled. A double-sided adhesive tape 4 is pasted to the rear surface of the mold frame MFR in a predetermined location. Next, the portion 2 of the flexible printed circuit FPC on which light emitting diodes are mounted is secured to the mold frame by positioning the through holes 30 in the flexible printed circuit FPC to the boss pins 3 formed on the mold frame. Thus, the boss pins 3 and the through holes 30 make the assembling process easy, and it is also possible to precisely position the portion on which light emitting diodes are mounted. FIG. 8 is a perspective diagram showing the portion on which light emitting diodes are mounted in FIG. 2 and how it looks after the pasting process in FIG. 7.

Figure 9:
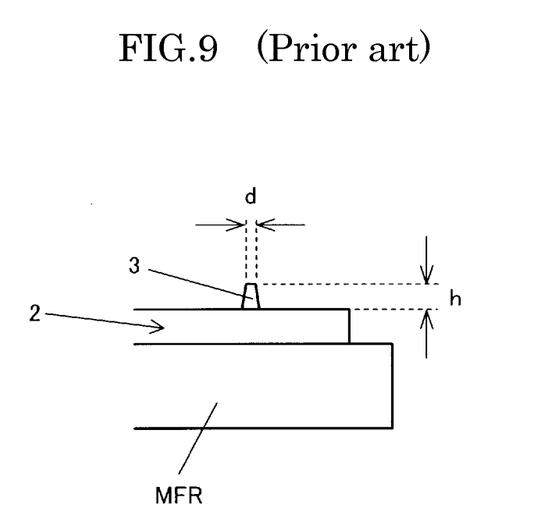
FIG. 9 is a side diagram showing a boss pin in FIG. 7 and the portion around it.

FIG. 9 is a side diagram showing a boss pin 3 and the portion around it, which shows that the boss pins 3 for positioning protrude the most on the rear surface of the liquid crystal display module in such a state that the portion 2 on which light emitting diodes are mounted is pasted to the mold frame MFR with the double-sided adhesive tape in between. In FIG. 9, which illustrates how the boss pin protrudes, h is the length by which the boss pin protrudes from the surface of the flexible printed circuit and d is the diameter of the boss pin. In general, h≧0.1 mm and d≧0.5 mm.

Though it is necessary to make the length h of the boss pin 3 as short as possible, particularly in order to make the liquid crystal display device thinner, the process for positioning the portion 2 becomes inefficient when h is short. In addition, when stress is applied to a boss pin 3 during or after the incorporation of the liquid crystal display device into the main body, such as of a portable phone, stress is applied to the liquid crystal display panel held in the mold frame MFR as well, and there is a risk of a glass substrate that forms the liquid crystal display panel being damaged.

SUMMARY OF THE INVENTION

An object of the present invention is to solve the above described problem and provide a thin liquid crystal display device where it is easy to position the flexible printed circuit on which light emitting diodes are mounted.

In order to achieve the above described object, the liquid crystal display device according to the present invention has the following features.

(1) A liquid crystal display device has a liquid crystal display panel and a flexible printed circuit that is connected to the liquid crystal display panel and supplies power for driving display pixels, and is characterized in that light emitting diodes are mounted on a portion of the flexible printed circuit, a mold frame is provided to contain the light emitting diodes, and through holes for positioning are created in both the flexible printed circuit and the mold frame.

(2) The liquid crystal display device according to the above (1) is characterized in that a pin on an assembly jig is inserted into the through holes in the mold frame and the flexible printed circuit when the liquid crystal display device is assembled.

(3) The liquid crystal display device according to the above (1) or (2) is characterized in that a double-sided adhesive tape is provided between the liquid crystal display panel and the mold frame, and a through hole or a notch is created in the double-sided adhesive tape so as to correspond to the through hole in the mold frame.

According to the present invention, through holes for positioning are created in both the flexible printed circuit and the mold frame, and a pin on the assembly jig is inserted into these through holes when the liquid crystal display device is assembled. Thus, the flexible printed circuit on which light emitting diodes are mounted can be easily positioned, and after assembly, the assembly jig is removed and the pin that protrudes from the rear surface of the liquid crystal display device is removed, and therefore it is possible to provide a thin liquid crystal display device.

DESCRIPTION OF THE EMBODIMENTS

The liquid crystal display device according to the present invention is the same as the one shown in FIGS. 1, 3, 4 and 6, and therefore the descriptions thereof are omitted. The structure according to the present invention is described in detail below.

Figure 10:
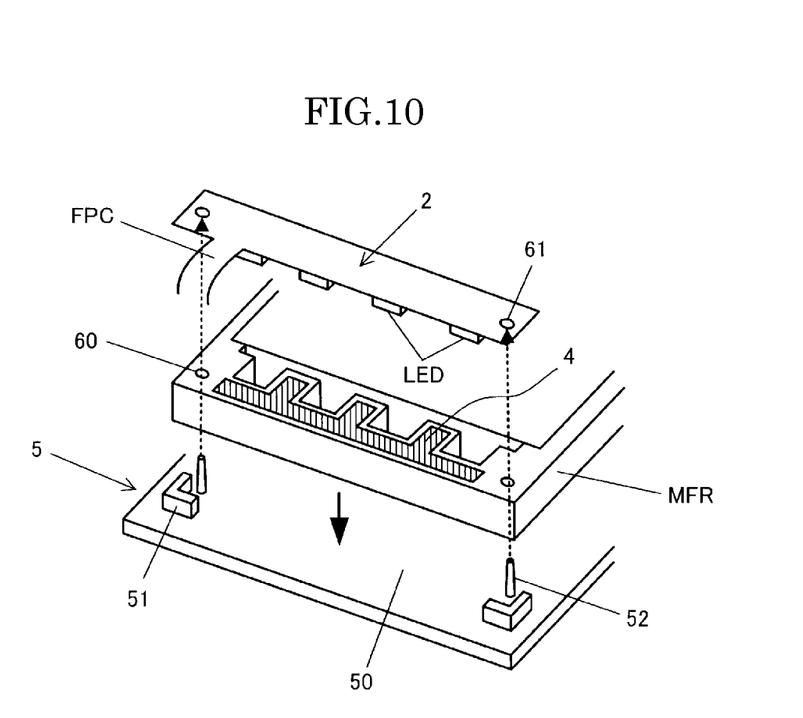
FIG. 10 is a perspective diagram showing how the process looks when assembling the liquid crystal display device according to the present invention.

As shown in FIG. 10, the liquid crystal display device according to the present invention has a liquid crystal display panel (not shown) and a flexible printed circuit (FPC) that is connected to the liquid crystal display panel and supplies power for driving display pixels, and is characterized in that light emitting diodes (LED) are mounted on a portion of the flexible printed circuit, a mold frame (MFR) is provided to contain the light emitting diodes, and through holes (61, 60) for positioning are created in both the flexible printed circuit and the mold frame.

As shown in FIG. 10, an assembly jig 5 where means 51 for positioning the mold frame and pins 52 are provided in predetermined locations of a plate 50. The positioning means 51 are optional, and it is also possible for the pins 52 to position the mold frame.

Figure 11:
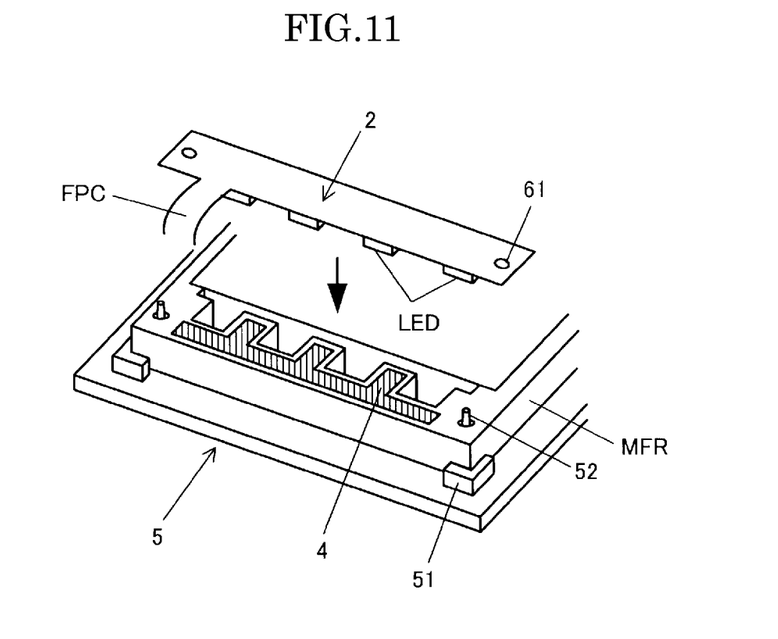
FIG. 11 is a diagram showing how the mold frame in FIG. 10 is placed on the assembly jig.
Figure 12:
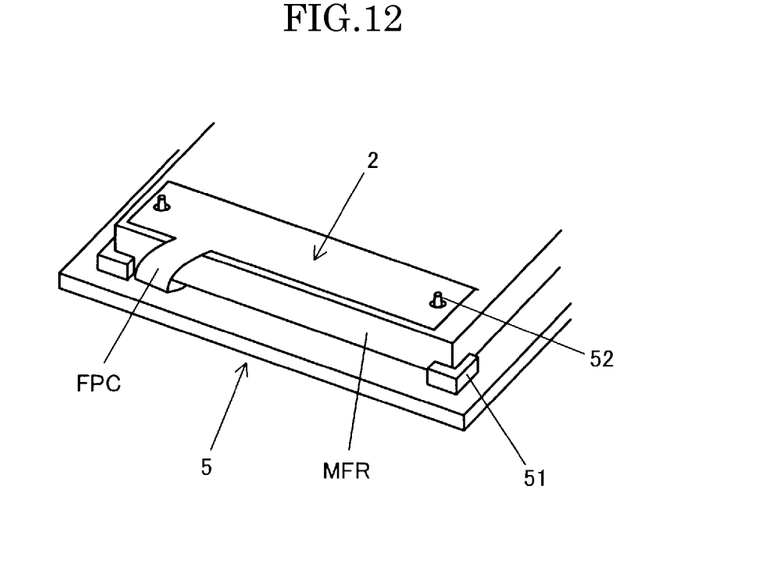
FIG. 12 is a diagram showing how the portion on which light emitting diodes are mounted in FIG. 11 is positioned.

The mold frame MFR and the portion 2 of the flexible printed circuit on which light emitting diodes are mounted are provided on the assembly jig 5 so that they are layered on top of each other. FIG. 11 shows a state where the mold frame MFR is positioned on the assembly jig, and FIG. 12 shows a state where the portion 2 of the flexible printed circuit on which light emitting diodes are mounted is incorporated into the mold frame.

During the assembly, the through holes 60 in the mold frame MFR are engaged with the pins 52 on the assembly jig, and then the through holes 61 in the flexible printed circuit FPC are engaged with the pins 52. As a result, it is possible to precisely position the flexible printed circuit in an appropriate location even though no boss pins are formed on the mold frame or the light guiding plate.

In addition, the liquid crystal display device (mold frame and flexible printed circuit) is removed from the assembly jig after being assembled, and thus there are no pins on the rear side of the liquid crystal display device, and it is possible to make the liquid crystal display device thin.

In addition, it is not necessary for devices, such as portable phones, into which the liquid crystal display device is incorporated to have a means for avoiding protrusions because there are no protrusions on the rear side of the liquid crystal display device, unlike conventional ones. Furthermore, there is no concern about stress being applied to protrusions (boss pins) in the mold frame, and thus there is no concern about damaging a glass substrate of the liquid crystal display panel.

It is possible to set the pins on the assembly jig to an appropriate length so that a state for making the assembly process easier can be achieved.

The mold frame MFR and the flexible printed circuit FPC are secured to each other with a double-sided adhesive tape 4, and the pins 52 on the assembly jig can be used when the double-sided adhesive tape is placed in a certain location on the mold frame MFR. At the time of assembly, a double-sided adhesive tape that is incorporated with a peeling film is usually used such that through holes are created in predetermined portions of the double-sided adhesive tape with the peeling film, the through holes are engaged with the pins 52 on the assembly jig, one side of the double-sided adhesive tape is pasted to the mold film, and after that the peeling film is peeled, and thus the double-sided adhesive tape can be positioned in a predetermined location on the mold film.

Figure 13:
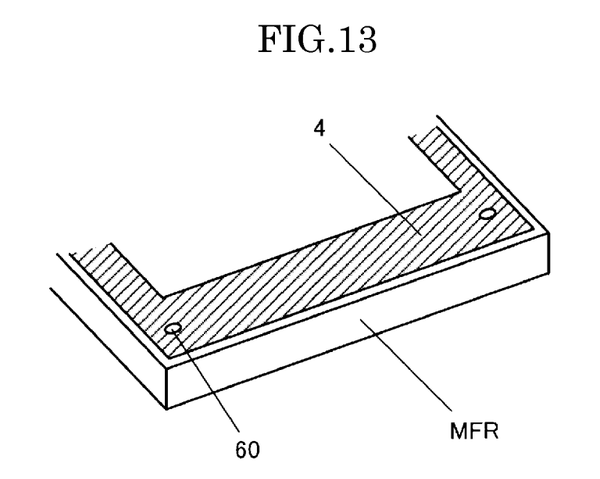
FIG. 13 is a diagram showing how a double-sided adhesive tape is provided on the front side of the mold frame.
Figure 14:
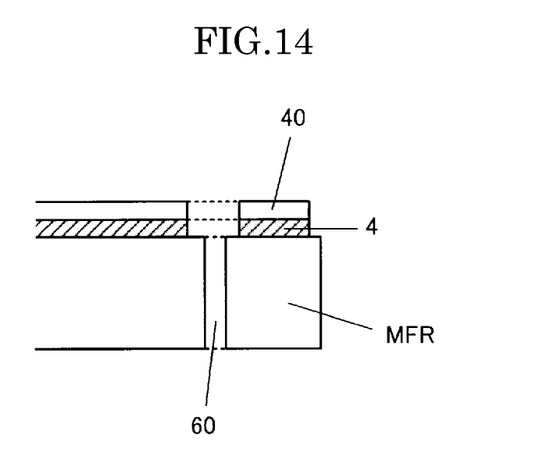
FIG. 14 is a diagram illustrating the positional relationship between the double-sided adhesive tape in FIG. 13 and the mold frame when the double-sided adhesive tape is provided.

The through holes in the mold frame and the assembly jig can also be used to position the liquid crystal display panel and the double-sided adhesive tape that is used to secure the liquid crystal display panel. FIG. 13 shows how the double-sided adhesive tape 4 is pasted to the front side of the mold frame MFR. In order to position the double-sided adhesive tape 4, as shown in FIG. 14, through holes are created in the double-sided adhesive tape 4 having a peeling film 40 and the through holes in the double-sided adhesive tape are positioned in the same locations as the through holes 60 in the mold frame MFR. It is possible to use the pins 52 on the assembly jig for the positioning process. After that, the peeling film 40 is peeled and a liquid crystal display panel is placed and secured on top of this.

Figure 15:
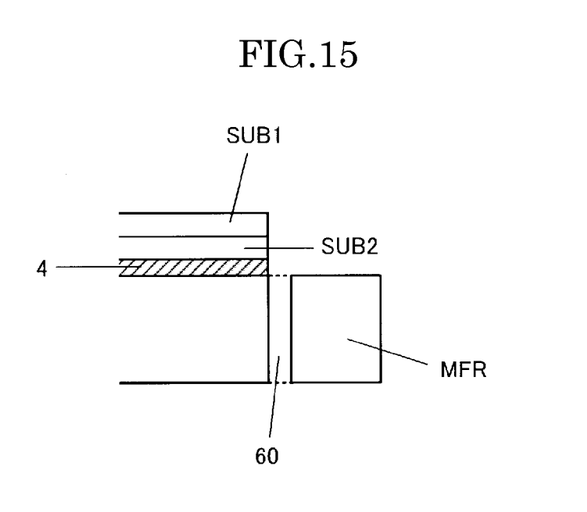
FIG. 15 is a diagram illustrating a mold frame on which a double-sided adhesive tape and a liquid crystal display panel are provided according to another embodiment.
Figure 16:
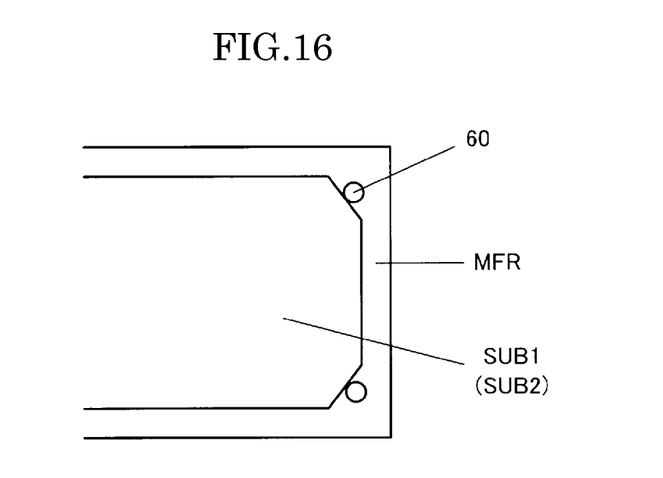
FIG. 16 is a plan diagram showing the embodiment in FIG. 15.

In addition, it is not necessarily through holes that are created for positioning the double-sided adhesive tape or the liquid crystal display panel. As shown in FIGS. 15 and 16, for example, it is possible to cut off the corners of the double-sided adhesive tape and the liquid crystal display panel so that cut corners make contact with the pins 52 on the assembly jig that protrude through the through holes in the mold frame, and thus the double-sided adhesive tape and the liquid crystal display panel can be positioned relative to the mold frame.

As described above, according to the present invention, it is possible to provide a thin liquid crystal display device where the flexible printed circuit on which light emitting diodes are mounted can be easily positioned.

What is claimed is:

1. A liquid crystal display device having a liquid crystal display panel and a flexible printed circuit that is connected to the liquid crystal display panel and supplies power for driving display pixels, characterized in that
   light emitting diodes are mounted on a portion of the flexible printed circuit,
   a mold frame is provided to contain the light emitting diodes, and
   through holes for positioning are created in both the flexible printed circuit and the mold frame.

2. The liquid crystal display device according to claim 1, characterized in that a pin on an assembly jig is inserted into the through holes in the mold frame and the flexible printed circuit when the liquid crystal display device is assembled.

3. The liquid crystal display device according to claim 2, characterized in that a double-sided adhesive tape is provided between the liquid crystal display panel and the mold frame, and a through hole or a notch is created in the double-sided adhesive tape so as to correspond to the through hole in the mold frame.

4. The liquid crystal display device according to claim 1, characterized in that a double-sided adhesive tape is provided between the liquid crystal display panel and the mold frame, and a through hole or a notch is created in the double-sided adhesive tape so as to correspond to the through hole in the mold frame.

* * * * *